United States Patent [19]

Clem

[11] Patent Number: 5,114,892
[45] Date of Patent: May 19, 1992

[54] CLAY MIXTURE HAVING CONTAMINATION RESISTANCE

[75] Inventor: Arthur J. Clem, Chicago, Ill.

[73] Assignee: James Clem Corporation, Chicago, Ill.

[21] Appl. No.: 631,832

[22] Filed: Dec. 21, 1990

Related U.S. Application Data

[60] Division of Ser. No. 304,464, Feb. 1, 1989, Pat. No. 4,997,695, which is a continuation-in-part of Ser. No. 274,166, Nov. 21, 1988, Pat. No. 4,997,701.

[51] Int. Cl.⁵ .............................................. C04B 33/00
[52] U.S. Cl. ................................... 501/141; 501/142; 501/147; 106/DIG. 4
[58] Field of Search ................. 501/141, 147, 142; 106/DIG. 4

[56] References Cited

U.S. PATENT DOCUMENTS

| | | | |
|---|---|---|---|
| 2,863,509 | 12/1958 | Messenger et al. | 501/147 X |
| 3,186,896 | 5/1962 | Clem. | |
| 4,005,582 | 8/1975 | Tamaro | 61/35 |
| 4,048,373 | 10/1975 | Clem | 428/454 |
| 4,055,937 | 7/1976 | Tamaro | 52/577 |
| 4,056,154 | 7/1976 | Tamaro | 175/416 |
| 4,075,852 | 7/1976 | Tamaro | 61/35 |
| 4,103,499 | 5/1977 | Clem | 61/50 |
| 4,139,588 | 3/1978 | Clem | 264/232 |
| 4,148,662 | 4/1979 | Hughes et al. | 501/141 |
| 4,209,568 | 6/1980 | Clem | 428/454 |
| 4,467,015 | 11/1981 | Clem | 428/454 |
| 4,501,788 | 9/1982 | Clem | 428/240 |

*Primary Examiner*—Karl Group
*Attorney, Agent, or Firm*—Baker & McKenzie

[57] ABSTRACT

A mixture of swellable clay, such as bentonite, is charged with an additive which provides an excess of single-charged cations which tend to neutralize the deleterious effects of double-charged cations which are naturally present in seawater and industrial waste. The mixture is deposited on and carried by a sheet to facilitate its uses as a pond liner or a foundation sealant.

3 Claims, No Drawings

CLAY MIXTURE HAVING CONTAMINATION RESISTANCE

This is a division of application Ser. No. 304,464, filed Feb. 1, 1989, now U.S. Pat. No. 4,997,695, which is a continuation-in-part of application Ser. No. 274,166, filed Nov. 21, 1988, now U.S. Pat. No. 4,997,701.

BACKGROUND AND SUMMARY OF THE INVENTION

The present invention relates to a clay mixture and a product made therefrom for use in confining or preventing the flow of seawater and other solutions containing cations, particularly cations found in industrial waste.

The importance of preventing the flow and leakage of toxic waste has become increasingly important. Proper containment of liquid industrial waste and sewage is critical to the continued health of our environment. As new processes are used in industry, new problems arise in treating the by-product of those processes.

Bentonite is a particularly well-suited clay for use in the formation of fluid barriers. When wetted, bentonite swells, or hydrates, by absorbing films of water that are thicker than those which form on other clays. The water absorbed by bentonite is retained even when subjected to high pressures. Bentonite is capable of swelling as much as ten to fifteen times its dry volume, and can absorb water to almost five times its own dry weight, while retaining its impermeability.

A very important characteristic of bentonite is that it will swell when uncontained, but will not exert significant pressure when confined against further swelling.

Various references acknowledge that swellable clay is generally suitable to form water impervious layers in a soil structure. Furthermore, a series of patents issued to Arthur G. Clem, i.e. U.S. Pat. Nos. 4,048,373; 4,103,499; 4,139,588; 4,467,015, suggest that a combination of additives is "absolutely necessary" for the proper performance of a bentonite layer in a seawater environment. The combination which is said to be essential includes a water-soluble dispersant, and a water-soluble polymer. An exemplary dispersant is said to be a salt of phosphoric acid. Alternative dispersants suggested in the Clem patents include salts of alkaline earth metals. An example of the other essential element mentioned in the Clem patents is polyacrylic acid. There is no clear explanation of the theory behind the selection of these "essential" components of the mixture.

It is believed that the contaminating effects of seawater and other solutions, such as sewage leachate and paper pulp sludge, upon the swellability of a bentonite layer is due to the presence of positively charged ions, such as calcium ions, which have double charges. It is understood that bentonite forms a multi-layer crystalline structure in the presence of water, and in the presence of pure water its ability to swell is at a maximum. In sodium bentonite, sodium molecules are subject to attack or replacement (through ion exchange) by cations having a double-charge. The resulting removal of sodium from the sodium bentonite structure is believed to cause a reduction in the ability of the bentonite layer to perform as an impermeable layer. Thus, in the presence of seawater or other solutions which may contain various concentrations of cationic contaminants, the ability of the bentonite to perform effectively is inhibited.

It has been found that by significantly increasing the ratio of single-charged ions, such as sodium ions, to the number of detrimental cations, such as calcium ions, the ability of bentonite to swell in the presence of seawater can be improved. It is believed that by substantially outnumbering the deleterious double-charged cations with single-charged sodium cations, the chances for replacement of double-charged for single-charged cations is reduced. This may result from mere distribution or may be enhanced by the repulsion of particles having like charges. By surrounding the bentonite structure with "friendly" sodium ions, the integrity of the structure is protected. It is believed that the same or similar detrimental double-charged cations, which give seawater its contaminative potential, are present in solutions such as paper pulp, sludge, and industrial waste of various kinds, particularly those containing double-charged cations of zinc, cadmium, nickel and other metals.

Contrary to the teachings of Clem, as discussed above, it has been found that the presence of a water-soluble polymer is not essential to the formation of a mixture which will resist the detrimental effects of seawater.

U.S. Pat. No. 4,501,788 (the '788 patent), which is assigned to the assignee of the present invention, shows a particularly useful form in which the mixture of the present invention can be used. The '788 patent describes a flexible sheet comprising a support coated with a swellable bentonite. The support is a porous flexible layer of fabric. Such sheets are used to line ponds and lagoons and landfills, tank farms and hazardous waste sites. By using a sheet of swellable bentonite, an impervious layer is formed to prevent hazardous leachate from entering adjacent groundwater systems.

An important object of this invention is to provide an inexpensive and effective barrier to the flow of solutions through a soil structure or foundation.

Accordingly, a further object is to provide a mixture comprised of the minimum number of components necessary to resist the degradation of the clay layer by seawater and other solutions containing cations.

Still another object of the present invention is to enhance the contamination resistance of sodium bentonite clay with the addition of single-charged cations, which will tend to neutralize the contaminative effects of seawater and other cation carrying solutions.

These and other objects of the present invention will be apparent from the following detailed description of an embodiment of the invention.

DETAILED DESCRIPTION OF THE INVENTION

An effective mixture in accordance with the present invention consists of powdered, dehydrated bentonite, modified by the addition of trisodium polyphosphate, where the additive is combined with bentonite at a rate of or on the order of about ten (10) lbs. of additive per 2000 lbs. of bentonite. The components are preferably mixed thoroughly in either a batch or continuous process, and subsequently formed into a flexible sheet with the mixture sandwiched between two fabrics, at least one of which is fluid permeable.

The preferred thickness for the combined total is approximately ¼ inch, yielding a sheet having approximately 1 lb. of bentonite per square foot. It is recommended that the weight of trisodium polyphosphate not exceed about 60 lbs. per 2000 lbs. (or 3%) of bentonite and that the weight of trisodium polyphosphate be at least about 1 lb. per 2000 lbs. (or 0.05%) of bentonite. This range of ratios has been selected to resist the contaminative effects of solutions containing significant amounts of double-charged cations.

MIXTURE PREPARATION

Trisodium polyphosphate and bentonite are mixed and made into a sheet by the following process. Naturally mined bentonite is made into a thoroughly dehydrated powder or pellets. A large quantity of dehydrated powdered or pelletized bentonite is placed in a hopper along with a required amount of trisodium polyphosphate and mixed thoroughly, with both components preferably in the dry state. A thin layer of the resulting mixture is placed on a first geotextile or carrier. The carrier is preferably a permeable sheet made of polypropylene, polyester, jute or nylon. The carrier may be woven or perforated to make it permeable to liquids and gases. A woven material is preferred so that a larger surface area is provided to which the modified bentonite mixture may adhere. However, an impervious carrier may be appropriate in some instances.

After depositing the modified bentonite on the carrier material, a cover layer is placed over the bentonite layer. The cover layer is preferably a lightweight textile or textilelike material which is preferably highly fluid permeable. The purpose of the cover layer is to separate the bentonite layers in a rolled condition and to assist in keeping the sheet in a unitary or composite condition during the handling and placement of the sheet. Means for maintaining the internal integrity of the clay mass of the sheet includes an adhesive or binder, which may be a fibrous material containing a substantial amount of cellulose, and needling or compression of the clay to insure its retention by the carrier. A water soluble adhesive found to be effective is carbon methyl cellulose. It is important that the adhesive or binder be easily dissolved so that the bentonite can be fully exposed to solutions coming in contact with the sheet. Where solutions not primarily water are to be contained, other adhesives or binders may be used, but they should be chosen so that they are soluble in the fluid being contained by the bentonite layer.

The strength of the carrier must be such that when rolled up with the layer of modified bentonite, it can withstand transportation to remote areas by any of several means of transport, such as fork lifts, cranes, trucks, boats, etc., and so that it can withstand rough handling by construction workers and delivery personnel.

PERMEABILITY TESTING

Comparison permeability tests were performed to verify the effectiveness of the mixture of the present invention. Samples of sheets containing sodium bentonite clay, one treated in accordance with the present invention and one left untreated, were hydrated in a flexible wall triaxial permeameter. The permeant used was salt water. The tests showed that sodium bentonite clay treated with an additive in accordance with the invention had a hydraulic conductivity or permeability of $2 \times 10^{-10}$ centimeter per second (cm/sec), while the untreated sample of the same kind of clay had a permeability of $3 \times 10^{-6}$ cm/sec. The additive thus has the effect of improving the permeability of the clay by a factor of $1.5 \times 10^4 (15000)$.

Additional tests were performed on treated clay using permeants of sewage leachate and paper pulp sludge. The following table summarizes the test results:

| PERMEANT MATERIAL | SEAWATER | | SEWAGE LEACHATE CLAY WITH ADDITIVE | PAPER PULP SLUDGE CLAY WITH ADDITIVE |
| --- | --- | --- | --- | --- |
| | CLAY W/OUT ADDITIVE | CLAY WITH ADDITIVE | | |
| PERMEABILITY cm/sec | $3 \times 10^{-6}$ | $2 \times 10^{-10}$ | $8 \times 10^{-10}$ | $2 \times 10^{-10}$ |

It should be noted that all tests were performed using a closed triaxial permeameter to prevent evaporation of the permeant. Sand was placed adjacent to a clay layer in order to support the clay layer without affecting permeability measurement. In each test, the clay layer was approximately 0.5 cm thick. The tests were run until the permeability of the specimens stabilized. In all cases, the samples were presaturated with the permeant used in each respective test.

As discussed above, it is the large number of single-charged sodium cations which result from solution of the additive which protect the structure of the hydrated sodium bentonite. The polarity and concentration of the excess sodium cations prevent infiltration of double-charged cations, which would otherwise tend to break down the crystalline structure of the hydrated bentonite. By "doping" the clay mixture with large amounts of excess sodium cations, the detrimental effects of the double-charged cations are prevented.

While the additive used in the tested samples was trisodium polyphosphate, sources of single-charged cations which can be used in accordance with this invention include any of the family of sodium salts of polyphosphoric acids, for example, molecularly dehydrated sodium phosphates, such as, but not limited to sodium tripolyphosphate, tetra-sodium pyrophosphate, sodium acid pyrophosphate, sodium hexameta phosphate and the like, which can be added to bentonite in the same amounts as trisodium polyphosphate. These products are made by reacting phosphoric acid with an alkali such as sodium carbonate or sodium hydroxide, applying heat to expel water until the salt melts, then cooling rapidly into a glass. The composition of the molten salt can be controlled by the amount of alkali used to react with the phosphoric acid.

Accordingly, it is intended that the scope of the invention be limited not by the specific, illustrated example, but rather by the scope of the appended claims interpreted in light of the pertinent prior art.

We claim:

1. A dry clay mixture for use in restricting flow of water consisting of:
    a substantially dry bentonite,
    and about 0.05% by weight to about 3% by weight of a compound selected from the group consisting of sodium salts of polyphosphoric acids.
2. A clay mixture in accordance with claim 1 wherein:
    the amount of said compound is about 0.05% by weight.
3. A clay mixture in accordance with claim 1 wherein:
    said compound is trisodium polyphosphate.

* * * * *